United States Patent [19]
Verlinden et al.

[11] Patent Number: 5,871,879
[45] Date of Patent: Feb. 16, 1999

[54] MATERIAL COMPRISING A LAYER ON A GLASS SUPPORT

[75] Inventors: Bartholomeus Verlinden, Tongeren; Pascale Steenhoudt, Arquennes, both of Belgium

[73] Assignee: AGFA-Gevaert, N.V., Mortsel, Belgium

[21] Appl. No.: 956,363

[22] Filed: Oct. 23, 1997

Related U.S. Application Data

[60] Provisional application No. 60/032,944, Dec. 9, 1996.

[30] Foreign Application Priority Data

Oct. 24, 1996 [EP] European Pat. Off. .............. 96202968

[51] Int. Cl.$^6$ .............................. G03C 1/765; G03C 1/76; G03F 7/07; G03F 7/09
[52] U.S. Cl. ............................ 430/155; 430/20; 430/204; 430/207; 430/227; 430/272.1; 430/496; 430/501; 430/523; 430/939; 430/964; 65/30.14; 428/157; 428/192; 428/426; 428/427

[58] Field of Search ...................................... 430/496, 501, 430/523, 204, 207, 227, 272.1, 155, 939; 65/30.14; 428/157, 192, 426, 427

[56] References Cited

U.S. PATENT DOCUMENTS

| | | | |
|---|---|---|---|
| 4,130,680 | 12/1978 | Ference et al. | 430/496 |
| 4,656,118 | 4/1987 | Ohara et al. | 430/272.1 |
| 5,780,371 | 7/1998 | Rifqi et al. | 65/30.14 |

*Primary Examiner*—Richard L. Schilling
*Attorney, Agent, or Firm*—Breiner & Breiner

[57] ABSTRACT

According to the present invention an element comprising a layer on a glass support characterised in that: (i) the thickness of said glass support is less than 1.2 mm, (ii) said glass support has a failure stress (under tensile stress) equal to or higher than $5 \times 10^7$ Pa and (iii) the sides in the longitudinal direction have a rounded border with a radius in the order of magnitude of half of the thickness of the glass support.

17 Claims, No Drawings

MATERIAL COMPRISING A LAYER ON A GLASS SUPPORT

DESCRIPTION

Priority is claimed under 35 USC 119 (e) from Provisional application 60/032,944 filed Dec. 9, 1996.

FIELD OF THE INVENTION

This invention relates to a process for continuously applying layers on glass. In particular this invention relates to silver halide photographic materials coated on glass in a continuous way.

BACKGROUND OF THE INVENTION

For many applications of silver halide photographic materials, dimensional stability is of utmost importance. Although polyester based plastic films can be used to produce photographic materials showing good dimensional stability, it is for speciality applications, e.g. photomicrography, some graphic arts application, photofabrication of PCB (printed circuit boards), etc, still preferred to use silver halide photographic materials coated on glass. Also in application where the material has to have high thermal stability, the use of a glass support is preferred over the use of a plastic film support. An example of an application where high thermal stability is needed is the manufacture of LCD's as described in EP-B 396 824 and EP-A 615 161. In the manufacture of colour filters for the production of colour LCD's the optical isotropy of glass (most polymer films are optically anisotropic, i.e. show birefringence) is an advantage.

Applying layers on glass plates in a continuous process is described in EP-A 716339. Said application discloses a process for applying various layers on a glass support in a continuous applying machine characterized in that (i) the thickness of the glass support is lower than 1.2 mm and (ii) the glass support has a failure stress (under tensile stress) equal or higher than $1 \times 10^7$ Pa and an elasticity modulus (Young's modulus) equal to or lower than $10 \times 10^{10}$ Pa. However said materials still show two distinct disadvantages. First of all said material can not be wound on a small core with a sufficient safety factor to avoid premature breaking and secondly the strength of said glass is to low for use in greater dimensions such as is needed for LCD's.

Chemical strengthened float glass is known which has greater strength than normal float glass. EP-A 286018 discloses a support consisting of chemically straightened glass. However said glass still cracks from the border out. JP-58-208728 describes a liquid crystal color display between substrates each made of borosilicate glass coated with a silica film. However said glass still cracks from the border out. JP-57-205343 discloses the preparation of tempered glass by subjecting the glass to heat treatment at a fixed temperature raising rate and ion exchange treatment, and forming a metallic film. However said glass still cracks from the border out. JP-58-156554 describes the prevention of the deterioration of the thin film formed on the surface of a glass substrate, by reducing the content of sodium oxide in the surface layer of a borosilicate glass containing sodium oxide by ion exchange treatment. However said glass still cracks from the border out. However the literature is silent about the solution for the problem of winding glass upon small cores.

Furthermore in chemical hardened glass there still originates cracks at the border of said glass.

SUMMARY OF THE INVENTION

It is an object of the invention to provide an element having a layer on a glass support, which is capable of being wound on a small core.

It is a further object of the invention to provide a photosensitive material comprising a glass support, produced in a continuous process, which is capable of being wound on a small core.

It is a still further object of the invention to provide a dry imaging material comprising a glass support, produced in a continuous process which is capable of being wound on a small core.

Further objects and advantages of the invention will become clear from the detailed description hereinafter.

According to the present invention an element is provided comprising a layer on a glass support characterised in that:
(i) the thickness of said glass support is less than 1.2 mm and
(ii) said glass support has a failure stress (under tensile stress) equal to or higher than $5 \times 10^7$ Pa.
(iii) the sides in the longitudinal direction have a rounded border with a radius in the order of magnitude of half of the thickness of the glass support.

In a preferred embodiment said glass support is unwound from a roll wherein said roll comprises a core having a diameter between 0.05 m and 1 m.

Most preferably said glass support has a thickness equal to or lower than 0.8 mm, a failure stress (under tensile stress) equal to or higher than $10 \times 10^7$ Pa and is unwound from a roll comprising a core having a diameter between 0.05 and 0.80 m.

DETAILED DESCRIPTION OF THE INVENTION

The main advantages of glass as a support for any layer is the dimensional stability of the glass support and the recyclability, the main drawback is the risk for breaking and thus the impossibility of winding glass on a small core. In many applications, there exist a need for glass with an increased area without an increase in weight. So, there exist a need for thinner glass. However a thinner glass support is more susceptible to mechanical failure such as break. We have now found that glass with a thickness less than 1.2 mm and a failure stress (under tensile stress) equal to or higher than $5 \times 10^7$ Pa. and sides in the longitudinal direction which have a rounded border with a radius in the order of magnitude of half of the thickness of the glass support, preferably have a rounded border with a radius not more than half of the thickness of the glass support combines the advantage of a high mechanical strength with the capacity of being wound on a small core. It is surprising that glass with such high failure stress can be made in an economical way when said glass has a thickness of less than 1.2 mm. The need for glass supports with thickness under 1.2 mm is not uncommon. E.g. in the manufacture of LCD the use of glass supports as thin as 0.7 mm is advisable. Especially in this segment, the use of even thinner glass supports is highly desired, both for economical reasons and reasons of weight.

Not only in the production of colour filters for use in the manufacture of LCD's thin glass is desirable, but in all applications where the higher dimensional stability, transparency, etc of glass, compared to plastic film are desired, a thin glass support is desirable. In photography an application can be in e.g. graphic arts material. Not only silver halide materials, where the light sensitive layer(s) are essentially coated from a liquid coating solution, but also in heat mode imaging materials, where e.g. vacuum deposited metal layers (especially bismuth layers) are used as image recording medium can benefit from having a thin glass support. In fact all imaging materials, where high dimensional stability is necessary, will benefit from being applied to a thin glass support. In all this applications it is also important that said glass support can be unwound from or wound up a small core e.g. for the ease of use in a conventional coating or sizing and packaging machine, for the transportation etc.

A glass support having a failure stress (under tensile stress) equal to or higher than $5\times10^7$ Pa, more preferably equal to or higher than $10\times10^7$ Pa, most preferably equal to or higher than $20\times10^7$ Pa can be obtained by using chemically strengthened glass. Chemically strengthened glass is glass where in both surface layers the original alkali ion is at least partially replaced by an alkali ion with a greater radius. In practice this means that in sodium lime silica glass potassium is substituted in the surfaces at least partially for sodium and that in lithium lime silica glass sodium is substituted in the surfaces at least partially for lithium for classical chemical strengthening.

The thickness of the chemically strengthened layer is herein defined as the thickness of the layer at the surface of each side of the support wherein said substitution takes place for at least 25%. For economical reasons the thickness of the chemically strengthened layer of the glass support is preferably less than one quarter of the total thickness of the original glass, more preferably less than 30 $\mu$m, most preferably less than 15 $\mu$m. It is so that only the outerpart of the surface of the glass support is substituted and that the inner part of the glass support, which is not substituted remains (by far) the main part. More details about chemical strengthening of glass are i.a. given in "Glass Technology, Vol. 6, No. 3, page 90–97, June 1965 which therefor is incorporated herein by reference.

Preferably said chemical strengthening of the glass is executed on-line with the preparation of the float glass.

Said glass can be coated with a boro/silicate sol/gel coat having preferably a thickness of at least 100 $\mu$m, more preferably a thickness of 200 $\mu$m.

Said glass can be used in a sandwich or any other combination with normal glass coated with a boro/silicate sol/gel coat having preferably a thickness of at least 100 $\mu$m, more preferably a thickness of 200 $\mu$m. Said sandwiches are used e.g. for LCD's.

The application of any layer to a thin glass support can proceed by sputtering, as disclosed e.g. in WO 87/00982, by phisical vapour deposition, by chemical vapour deposition, by lamination of a layer (optionally via an adhesive layer) via a material comprising a layer on a temporary support as well as by coating from a liquid coating solution.

The problems of coating one or more layers on glass supports as thin as or thinner than 0.7 mm in a discontinuous coating process are even more severe than problems associated with the discontinuous coating on thicker glass supports, because wide and thin glass plates that are only supported by the edges (as is done in a discontinuous process for coating glass plates) bend in the middle and can not easily be coated uniformly.

It has been found than, when it is needed to coat a layer on a glass support, which is thinner than 1.2 mm, it is possible to supply the glass support on roll. This brings the great advantage that such a support can be coated in any continuous coating equipment for coating layers on plastic films. It was found that when glass is not thicker than 1.2 mm it can be presented in roll form and thus be unwound and coated as a web in a continuous coating machine. This is particularly so when said glass support has an elasticity modulus (Young's modulus) equal or lower than $10\times10^{10}$ Pa, preferably lower than $7\times10^{10}$ Pa. When said glass has according to the invention a failure stress (under tensile stress) equal to or higher than $5\times10^7$ Pa, preferably higher than $10\times10^7$ Pa, it can be presented in roll form on a small core. When the glass fulfils these requirements, it can, depending on the thickness, be presented on rolls wound upon a core, said core having a diameter between 0.05 m and 1 m.

EP-A 716339 discloses a method for continuous coating glass on rol with a layer which therefor is incorporated herein by reference.

Glass on roll according to the invention for coating a layer on it in a continuous way will have a coating width of at least 5 cm. I.e. while the glass is at most 1.2 mm thick, the ratio width/thickness of glass rolls according to the present invention is at least 40.

Before coating the surface on one or both sides of the rolled glass can be pretreated, e.g can be etched.

Glass on roll according to the invention can be coated with any of the coating solutions that are now applied to flat sheets of glass, e.g. filter layers, adhesive layers, etc. Glass on roll can be coated by any of the continuous coating techniques that are used to coat solutions on running webs, e.g. dip coating, rod coating, blade coating, air knife coating, gravure coating, reverse roll coating, extrusion coating, slide coating and curtain coating. An overview of these coating techniques can be found in the book "Modern Coating and Drying Technology", Edward Cohen and Edgar B. Gutoff Editors, VCH publishers, Inc, New York, N.Y., 1992. It is possible to coat simultaneously multiple layers on glass on roll by coatings technique known as useful for the simultaneous coating of multiple layers as e.g. slide coating, curtain coating etc.

A continuous layer can be applied on glass not only by coating as explained above but also by vacuum deposition, sputtering and lamination. Said layer can be an image-forming layer such as a physical nuclei including layer or a layer used for a photoresist or for the printing plates mentioned furtheron. Said layer can be a non-image forming layer such as metallic layers, preferably selective reflecting metallic layers, adhesive layers, magnetic layers, hardcoat layers, layers applied by ink jet, orientation layers, ITO layers, electrochromic and photochromic layers, pigment layers, thermoadhesive layers and thermoplastic layers.

A discontinuous layer can be applied on glass by laminating, by ink jet, by electrophotography, by thermosublimation, by printing, by vacuum evaporation through a mask, etc. Said layer can be an image-forming layer or a non-image forming layer. examples of such layers are given above.

Said continuous or discontinuous layers can be combined and can be applied on one side or on both sides of the glass support. Said layers can be used as protective layers or as aiding layers (metal, paper).

Glass on roll according to the invention can preferably be used as support for any photosensitive or thermosensitive layer.

Glass on roll according to the invention is especially useful for the production of silver halide photographic materials on glass support, where at least one aqueous hydrophillic colloid solution comprising silver halide crystals is coated on said glass support. The use of thin glass (thickness below 1.2 mm, preferably below 0.8 mm) as support for silver halide photographic materials is desirable since glass is a cheap, ecological and perfectly recyclable support. Glass in roll form can, when its thickness is between 50 and 300 μm (0.05 and 0.3 mm), favourably replace plastic films as support for photographic materials. Such a glass support can be used in clear or coloured (grey, blue, etc.) form.

The silver halide photographic material coated on the rolled glass according to the invention can be of any type known in the art, e.g. black and white materials, colour materials, materials designed for use in graphic arts, materials for use in medical diagnosis, motion picture materials, diffusion transfer materials, in a dye diffusion transfer process operating with silver halide emulsion layers, etc. The principles and embodiments of silver image formation by DTR-photography are described e.g. by André Rott and Edith Weyde in the book "Photographic Silver Halide Diffusion Processes"—The Focal Press London and New York (1972), and the principles and embodiments of the production of colour images by dye diffusion transfer are described e.g. by C. Van de Sande in Angew. Chem. Int. Ed. Engl. 22, (1983) p. 191–209.

For the composition of silver halide emulsion layers and auxiliary layers reference is made e.g. to Research Disclosure 17,643 of December 1978 and Research Disclosure 307,105 of November 1989.

Silver halide photographic materials coated on rolled glass according to the present invention, can comprise any know hydrophillic binder or a mixture of hydrophillic and hydrophobic binders. Useful binders are e.g. gelatin, polyvinylalcohol, polyvinylpyrollidone, dextrans, synthetic clays, polyamides, etc, or mixtures of these binders. The emulsions can comprises any known polymeric latex.

The silver halide photographic material coated on the rolled glass can comprise a single layer of a silver halide emulsion, or multiple layers of the same or different silver halide emulsions The silver halide emulsions used in the photographic materials coated on rolled glass can comprise any type of photosensitive silver halide, e.g. silver bromide, silver chloride, silver chloroiodide, silver bromoiodide or silver chlorobromoiodide or mixtures thereof. The average particle size is preferably in the range of 0.01 to 1.2 μm. The size distribution of the silver halide particles can be homodisperse or heterodisperse.

The crystal habit of the silver halide particles used in silver halide photographic materials coated on rolled glass, according to the present invention, can be of any type known in the art. The silver halide particles can have a pure cubic or octahedral habit without twin planes. They can also have a mixed cubic/octahedral habit without twin planes. The silver halide crystal particles used in emulsion coated on rolled glass can also contain one or more twin planes, can be tabular as disclosed e.g. in DE 32 41 634 and DE 32 41 640 etc.

The light-sensitive silver halide emulsions can be chemically sensitized as described e.g. by P. Glafkides in "Chimie et Physique Photographique". Paul Montel, Paris (1987), by G. F. Duffin in "Photographic Emulsion Chemistry", The Focal Press, London (1966), and by V.L. Zelikman et al in "Making and Coating Photographic Emulsion", The Focal Press, London (1966), and in "Die Grundlagen der Photographischen Prozesse mit Silberhalogeniden" edited by H. Frieser and published by Akademische Verlagsgesellschaft (1968). The light-sensitive silver halide emulsions, coated on glass rolls according to the present invention, can be spectrally sensitized with methine dyes such as those described by F. M. Hamer in "The Cyanine Dyes and Related Compounds", 1964, John Wiley & Sons. Dyes that can be used for the purpose of spectral sensitization include cyanine dyes, merocyanine dyes, complex cyanine dyes, complex merocyanine dyes, hemicyanine dyes, styryl dyes and hemioxonol dyes. Particularly valuable dyes are those belonging to the cyanine dyes, merocyanine dyes and complex merocyanine dyes. However in the particular case of a contact daylight material the emulsion is preferably not spectrally sensitized in view of the daylight stability.

The silver halide emulsion(s), coated on glass rolls according to the present invention, may be direct positive emulsions, either of the internally desensitized type or of the externally desensitized type comprising spectral desensitizers, e.g. pinakryptol yellow, etc.

The silver halide emulsion(s), coated on glass rolls according to the present invention, may comprise compounds preventing the formation of fog or stabilizing the photographic characteristics during the production or storage of photographic elements or during the photographic treatment thereof. Many known compounds can be added as fog-inhibiting agent or stabilizer to the silver halide emulsion.

The photographic material, coated on glass rolls according to the present invention, may further comprise various kinds of surface-active agents in the photographic emulsion layer or in another hydrophillic colloid layer. Suitable surface-active agents include non-ionic agents such as saponins, alkylene oxides e.g. polyethylene glycol, polyethylene glycol/polypropylene glycol condensation products, polyethylene glycol alkyl ethers or polyethylene glycol alkylaryl ethers, polyethylene glycol esters, polyethylene glycol sorbitan esters, polyalkylene glycol alkylamines or alkylamides, silicone-polyethylene oxide adducts, glycidol derivatives, fatty acid esters of polyhydric alcohols and alkyl esters of saccharides; anionic agents comprising an acid group such as a carboxy-, sulpho-, phospho-, sulphuric- or phosphoric ester group; ampholytic agents such as aminoacids, aminoalkyl sulphonic acids, aminoalkyl sulphates or phosphates, alkyl betaines, and amine-N-oxides; and cationic agents such as alkylamine salts, aliphatic, aromatic, or heterocyclic quaternary ammonium salts, aliphatic or heterocyclic ring-containing phosphonium or sulphonium salts. Such surface-active agents can be used for various purposes e.g. as coating aids, as compounds preventing electric charges, as compounds improving slidability, as compounds facilitating dispersive emulsification, as compounds preventing or reducing adhesion, and as compounds improving the photographic characteristics e.g higher contrast, sensitization, and development acceleration. Preferred surface-active coating agents are compounds containing perfluorinated alkyl groups.

Colour photographic recording materials, coated on rolled glass according to the present invention, normally comprise at least one silver halide emulsion layer unit for recording light of each of the three spectral regions red, green and blue. For various possible embodiments of colour materials, coated on rolled glass according to the present invention, reference is made to Research Disclosure December 1989, n° 308119 paragraph VII, which is incorporated by reference.

Before coating the silver halide material on a glass roll, according to the present invention the glass support can be pre-coated with a subbing layer for a good adherence to the hydrophillic layers. Particularly suitable subbing layers for said purpose are on the basis of silicon compounds, e.g. these described in U.S. Pat. No. 3,661,584 and GB-P 1,286, 467. For improving the adherence said compounds can be added to the composition of the hydrophillic colloid layer adjacent to the glass support.

The silver halide material can also contain protective layers, filter layers, barrier layers, layers comprising mordanting agents, backing layers, anti-curl layers, antistatic layers, antihalation layers both as an undercoat and as an antihalation layer coated on the back of the material.

Glass presented on roll form is especially well suited for use in the production of multicolour liquid crystal device comprising multicolour filters as disclosed in, e.g., EP-B 396 824 and EP-A 615 161. In this case the glass is coated with at least three emulsion layers, each being sensitive to light of a specific wavelength range.

Glass on roll is not only well suited for the production of multicolour filters mentioned above, but also electronic components, needed in multicolour liquid crystal displays, can be applied more easily and with better quality when said components can be applied on glass presented on roll form. For the application of said electronic components on sheet glass, silk screen printing is used, but with glass on roll, faster and more reliable printing techniques can be used, e.g. offset printing.

After coating and drying the photographic material coated on glass rolls, according to the present invention, can be cut into sheet materials, can be kept in roll form, etc.

When using silver halide photographic materials on rolled glass according to the present invention, it is necessary to keep the thin support flat, any known means to keep photographic materials coated on film support flat, can be used.

As explained above, it is not only beneficial to apply a silver halide material to a glass support, but is can also be beneficial to apply a dry imaging material to a thin glass support. The glass support according to the present invention is also very well suited for being used in a dry imaging material. Examples of a dry imaging material, are e.g., a DRAW (Direct Read After Write) or dry-processable (i.e., the latent image formed by exposure to radiation is made visible without the use of any liquid) recording element having high dimensional stability.

Several types of dry imaging systems can be applied to a glass according to the present invention.

In one embodiment the image recording layer in the recording element according to the present invention is a photodelamination layer as described in Research Disclosure (RD) Item 22202 (October 1982), p328–329.

According to another embodiment the image recording layer is a photochromic layer as described in Chapter 8 of K. I. Jacobson and R. E. Jacobson, Imaging Systems, Focal press (1976) p. 143 et seq.

According to a further embodiment the image recording layer is a heat-mode recording layer. Imaging elements comprising a heat-mode recording layer, as described e.g. in WO 94/18005, can advantageously be used for making a lithographic plate for use in lithographic printing. Said heat-mode recording layer can be composed of different materials. A survey of metals suited for use in DRAW heat-mode recording and suitable for use according to the present invention, is given in U.S. Pat. No. 4,499,178 and 4,388,400.

Metal layers have a relatively high reflectivity so that by their ablation in heat-mode recording spots of lower reflectivity are obtained. According to another embodiment an increase in transmission is obtained in laser beam heated areas by using an initially poor reflective heat-mode recording layer on a transparent support which layer becomes ablated in the laser beam struck areas. Such layer intended for COM-production and being made of co-deposited low melting point metals and sulphides such as GeS or SnS on a transparent support is described e.g. in Journal of Applied Photographic Engineering, Vol. 9, No. 1, February 1983, p. 12. For the production of optical disks wherein the information is read in the reflection mode said poor reflective heat-mode recording layer is applied onto a relatively high melting reflective support or layer, e.g. aluminium layer, carried by a support.

In a further embodiment heat-mode recording is carried out with binderless organic dye layers as described e.g. in the periodical Philips Techn. T. 41, p. 338–346 by D. J. Gravesteijn and J. Van Der Veen.

Thin (normally less than 1 μm thick) layers of metals, alloys or dyes suited for heat-mode recording are produced advantageously by vacuum-deposition.

In a preferred embodiment of a heat-mode recording material applied on a glass support according to the present invention, a thin vacuum deposited layer of Bi is used as the heat-mode recording layer because of its low toxicity and while it requires little energy for ablating by fusion or evaporation and forms films with ease by vapour deposition under vacuum conditions. Such a Bi (bismuth) layer is preferably protected against e.g. scratches, dust, etc, by a protective layer. Several methods are suitable for applying such a protective layer, e.g. coating from a liquid solution, spraying of a protective layer on the Bi layer, laminating a protective layer on the Bi layer, etc. A preferred method consists of laminating a protective organic resin layer in web form, by means of an adhesive layer and in the same vacuum environment as wherein the Bi layer is vacuum deposited, to said Bi layer, said Bi layer being deposited on a glass support according to the present invention. Such a method has been disclosed in detail in EP-B 384 041, that is incorporated herein by reference.

In a particularly preferred embodiment of the present invention an imaging element for making a lithographic printing plate is provided using a glass support in accordance with the present invention.

It was found that it was possible to produce a material for making a lithographic printing plate, having a surface capable of being differentiated in ink accepting and ink repellant areas in accordance with an image pattern, on a glass support according to the invention having a high mechanical strength and being capable of being unwound or wound on a small core or clamped on a small printing cylinder. The glass support for such a material was preferably less than 0.5 mm thick.

In one embodiment of the invention, the material further comprises a hydrophilic layer formed of a cross-linked hydrophilic polymer. A particularly suitable cross-linked hydrophilic layer may be obtained from a hydrophilic binder cross-linked with a crosslinking agent such as formaldehyde, glyoxal, polyisocyanate or a hydrolysed tetra-alkylorthosilicate. The latter is particularly preferred. As hydrophilic binder there may be used hydrophilic (co) polymers such as for example, homopolymers and copolymers of vinyl alcohol, acrylamide, methylol acrylamide, methylol methacrylamide, acrylic acid, methacrylic acid, hydroxyethyl acrylate, hydroxyethyl methacrylate or maleic anhydride/vinylmethylether copolymers. The hydrophilicity of the (co)polymer or (co)polymer mixture used is preferably the same as or higher than the hydrophilicity of polyvinyl acetate hydrolyzed to at least an extent of 60 percent by weight, preferably 80 percent by weight.

The amount of cross-linking agent, in particular of tetraalkyl orthosilicate, is preferably at least 0.2 parts by weight per part by weight of hydrophilic binder, preferably between 0.5 and 5 parts by weight, more preferably between 1.0 parts by weight and 3 parts by weight.

A cross-linked hydrophilic layer in accordance with the present invention preferably also contains substances that increase the mechanical strength and the porosity of the layer. For this purpose colloidal silica may be used. The colloidal silica employed may be in the form of any commercially available water-dispersion of colloidal silica for example having an average particle size up to 40 nm, e.g. 20 nm. In addition inert particles of larger size than the colloidal silica can be added e.g. silica prepared according to Stober as described in J. Colloid and Interface Sci., Vol. 26, 1968, pages 62 to 69 or alumina particles or particles having an average diameter of at least 100 nm which are particles of titanium dioxide or other heavy metal oxides. By incorporating these particles the surface of the cross-linked hydrophilic layer is given a uniform rough texture consisting of microscopic hills and valleys, which serve as storage places for water in background areas. The thickness of a cross-linked hydrophilic layer may vary in the range of 0.2 to 25 $\mu$m and is preferably 1 to 10 $\mu$m.

Further particular examples of suitable cross-linked hydrophilic layers for use in accordance with the present invention are disclosed in EP-A 601240, GB-P-1419512, FR-P-2300354, U.S. Pat. No. 3971660, U.S. Pat. No. 4284705 and EP-A 514490.

A very suitable material for making lithographic printing plates is a material comprising on a glass support a surface capable of being differentiated in ink accepting and ink repellant areas in accordance with an image pattern, characterised in that
i) said glass support has a thickness of not more than 0.5 mm, a failure stress of at least $50 \times 10^7$ Pa and
ii) said material further comprises a photo-sensitive layer.

More preferred materials for making a lithographic printing plate are materials comprising on a glass support a surface capable of being differentiated in ink accepting and ink repellant areas in accordance with an image pattern, characterised in that
i) said glass support has a thickness of not more than 0.5 mm, a failure stress of at least $50 \times 10^7$ Pa,
ii) said material further comprises a hydrophilic layer formed of a cross-linked hydrophilic polymer and
iii) said surface capable of being differentiated in ink accepting and ink repellant areas comprises a photosensitive layer.

A photosensitive layer in accordance with the present invention may comprise any suitable light-sensitive composition from which an ink accepting image on the hydrophilic surface of the support of the imaging element can be obtained. Examples of such light-sensitive compositions used herein are those comprising diazo compounds; those comprising azide compounds as disclosed in U.K. Patent Nos. 1,235,281 and 1,495,861; those containing photo-cross-linkable photopolymers as disclosed in U.S. Pat. Nos. 4,072,528 and 4,072,527 and in particular those described in more detail below.

Among these light-sensitive compositions, preferably used are those comprising diazo compounds since they are synthetically excellent in various properties such as storage properties of the photosensitive layer; developability, for instance, development latitude; image properties, e.g. quality of images; printing properties, e.g., ink receptivity and wear resistance; and low possibility of causing environmental pollution of developers used.

The light-sensitive compositions containing diazo compounds can roughly be divided in two groups, i.e. negative-working type and positive-working type ones.

The negative-working light-sensitive compositions containing diazo compounds comprise light-sensitive diazo compounds and preferably polymeric compounds. As the diazo compounds used in a positive-working light-sensitive composition, any compounds conventionally known may be utilized and typical examples thereof are o-quinonediazides and preferably o-naphthoquinonediazide compounds. These o-quinonediazide compounds may be used alone, but are preferably used as a mixture with an alkalki-soluble resin to form a light-sensitive layer.

A photosensitive layer in connection with this invention may be applied in the form of a multilayered structure. Moreover, the light-sensitive composition in the photosensitive layer or multilayer package may further comprise optional components such as dyes, plasticizers and components for imparting printing-out properties (ability of providing a visible image immediately after imagewise exposure).

The coated amount of a photosensitive layer applied onto the hydrophilic surface of a support preferably ranges from 0.1 to 7 g/m$^2$ and more preferably 0.5 to 4 g/m$^2$.

Preferred photo-cross-linking materials in the present invention are based on photo-cross-linking polymers having a maleimido group at their side chain.

In another embodiment of the invention, the material for making the lithographic printing plate is a DTR (diffusion transfer material), both in a two-sheet and in a mono-sheet process. In a two-sheet DTR process a sheet material comprising a silver halide material is image wise exposed and then contacted with a second sheet material, according to the present invention, comprising an image receiving layer with physical development nuclei. The sandwich of the two sheets is then processed and during this processing silver ions migrate to the image receiving layer and are precipitated on the physical development nuclei. In a mono-sheet DTR process both the silver halide layer and the image receiving layer are present in the same sheet material.

In preparing a two-sheet DTR material, the image receiving layer comprising physical development nuclei is provided on a glass support according to the present invention. Said glass support is first provided with a layer comprising a cross-linked hydrophilic polymer and on this hydrophilic polymer layer, a layer comprising physical development nuclei is provided, forming an image receiving layer. This image receiving layer is then used in a two-sheet DTR process. During the production of a lithographic printing plate a substance is image-wise transferred to the surface of said material thereby differentiating said surface in ink accepting and ink repellant areas in accordance with the image pattern being transferred.

The image receiving layer containing physical development nuclei is preferably free of hydrophilic binder but may comprise small amounts upto 30% by weight of the total weight of said layer of a hydrophilic colloid e.g. polyvinyl alcohol to improve the hydrophilicity of the surface.

Preferred development nuclei for use in accordance with the present invention are sulphides of heavy metals e.g. sulphides of antimony, bismuth, cadmium, cobalt, lead, nickel, palladium, platinum, silver, and zinc. Especially suitable development nuclei in connection with the present invention are palladium sulphide nuclei. Other suitable development nuclei are salts such as e.g. selenides, polyselenides, polysulphides, mercaptans, and tin (II) halides. Heavy metals, preferably silver, gold, platinum, palladium, and mercury can be used in colloidal form.

The glass support according to the present invention is also well suited for the production of a monosheet DTR material. A mono-sheet DTR material for producing a lithographic printing plate can be implemented in two forms. In a first implementation a DTR mono-sheet material for the production of a lithographic printing plate comprises a glass support, according to the present invention, and in the order given i) a hydrophilic polymer layer, which can optionally be cross-linked, ii) an image receiving layer comprising physical development nuclei and iii) a silver halide photographic emulsion layer. In a second implementation a DTR mono-sheet material for the production of a lithographic printing plate comprises a glass support, according to the present invention, and in the order given i) a silver halide photographic emulsion layer and ii) an image receiving layer comprising physical development nuclei.

The hydrophilic polymer layer useful in the first embodiment of a DTR mono-sheet material for the production of a lithographic printing plate can be a hydrophilic polymer layer as described herein above. The image receiving layer comprising physical development nuclei useful in a mono-sheet DTR material, according to this invention, can be the same as the image receiving layers described herein above.

The support of this sheet material is a glass support according to this invention. In a mono-sheet DTR material, an image receiving layer is provided with a photosensitive layer in water permeable contact with said image receiving layer. Layers being in waterpermeable contact with each other are layers that are contiguous to each other or only separated from each other by (a) waterpermeable layer(s). The nature of a waterpermeable layer is such that it does not substantially inhibit or restrain the diffusion of water or of compounds contained in an aqueous solution e.g. developing agents or the complexed silver.

The photosensitive material used both in a mono-sheet DTR process and in a two-sheet DTR process, with a material for making lithographic printing plates according to the present invention, can be any layer comprising a hydrophilic colloid binder and at least one silver halide emulsion, at least one of the silver halide emulsions being photosensitive.

Suitable photographic silver halide emulsion(s) are those described above. For use according to the present invention the silver halide emulsion or emulsions preferably consist principally of silver chloride while a fraction of silver bromide may be present ranging from 1 mole % to 40 mole %. Most preferably a silver halide emulsion containing at least 70 mole % of silver chloride is used. Preferably during or after the precipitation stage iridium and/or rhodium containing compounds or a mixture of both are added. The concentration of these added compounds ranges from $10^{-8}$ to $10^{-3}$ mole per mole of $AgNO_3$, preferably between $10^{-7}$ and $10^{-5}$ mole per mole of $AgNO_3$.

When the material for making a lithographic printing plate, according the present invention is a mono-sheet DTR material comprising a glass support, according to the present invention, and in the order given i) a hydrophilic polymer layer, which can optionally be cross-linked, ii) an image receiving layer comprising physical development nuclei and iii) a silver halide photographic emulsion layer preferably the gelatin layer(s) is(are) substantially unhardened. Substantially unhardened means that when such gelatin layer is coated on a subbed polyethylene terephthalate film base at a dry thickness of 1.2 g/m², dried for 3 days at 57° C. and 35% R.H. and dipped in water of 30° C., said gelatin layer is dissolved for more than 95% by weight within 5 minutes.

The silver halide emulsions may contain pH controlling ingredients. Preferably at least one gelatin containing layer is coated at a pH value not below the iso-electric point of the gelatin to avoid interactions between said gelatin containing layer and another (optional) layer. Most preferably all the gelatin containing layers are coated at a pH value not below the isoelectric point of their gelatin.

When the material for making a lithographic printing plate, according the present invention is a mono-sheet DTR material comprising a glass support, according to the present invention, and in the order given i) a hydrophilic polymer layer, which can optionally be cross-linked, ii) an image receiving layer comprising physical development nuclei and iii) a silver halide photographic emulsion layer, the material preferably also comprises an intermediate layer between the image receiving layer on the hydrophilic surface of a support and the photosensitive layer(packet) to facilitate the removal of said layer(packet) thereby uncovering the silver image formed in the image receiving layer by processing the imaging element. Examples of said intermediate layers are described in EP-A-410500 and EP-A-483415, which therefore are included herein by reference.

In a still further embodiment of the invention, there is provided, a driographic material for the production of a lithographic printing plate. This driographic material comprises a glass support, said glass support being at most 0.5 mm thick and having a failure stress of at least $50 \times 10^7$ Pa. Although it is possible to implement any driographic material for producing lithographic printing plates on a glass support according to the present invention, it is preferred to use driographic materials as described in EP-A 573 091, that is incorporated herein by reference. The main advantage of these driographic materials is the fact that the need for the use of an organic solvent in the development is avoided or that at least ecollogically more acceptable solvents can be used.

Therefore the driographic material comprising a glass support according to the present invention is a heat-mode recording material. Such a material is image-able by laser ablation and comprises on said glass support a first layer comprising a polymer and a second layer underlying said first layer, at least one of said first and second layer being characterised by efficient absorption of infrared radiation and said first and second layers exhibiting different affinities for a printing fluid selected from the group consisting of ink and an adhesive fluid for ink. Preferably this material comprises in said first layer a polysiloxane and is oleophobic.

The following example illustrates the present invention without being limited thereto. The percentages given are by weight unless otherwise stated.

EXAMPLE

A classical glass support having a failure stress (under tensile stress) of $2 \times 10^7$ Pa and a thickness of 600 $\mu$m can only be wound on a core with a diameter of 2 m, what is not suited for practical use. A thermally strengthened glass having a failure stress (under tensile stress) of $10 \times 10^7$ Pa, a thickness of 600 $\mu$m and sides with a rounded border with a radius of 300 $\mu$m can be wound on a core with a diameter of 100 mm, what is perfectly suited for practical use.

We claim:

1. An element comprising a layer on a glass support wherein:

(i) the thickness of said glass support is less than 1.2 mm, (ii) said glass support has a failure stress (under tensile stress) equal to or higher than $5 \times 10^7$ Pa and (iii) the sides in the longitudinal direction have a rounded border with a radius in the order of magnitude of half of the thickness of the glass support.

2. An element according to claim 1, wherein said glass support is a chemically strengthened glass.

3. An element according to claim 1, wherein said glass support has a failure stress (under tensile stress) equal to or higher than $10 \times 10^7$ Pa.

4. An element according to claim 2, wherein the thickness of a chemically strengthened layer at the surface of the support is less than one quarter of the total thickness of the original glass.

5. An element according to claim 4, wherein the thickness of said chemically strengthened layer at the surface of the support is less than 30 µm.

6. An element according to claim 1 wherein said glass support is present in a combination with normal glass coated with a boro/silicate sol/gel coat.

7. An element according to claim 1 wherein on said glass support a photosensitive or thermosensitive layer is applied.

8. A silver halide photographic material coated on a glass support wherein:

(i) the thickness of said glass support is lower than 1.2 mm, (ii) said glass support has a failure stress (under tensile stress) equal to or higher than $5 \times 10^7$ Pa and (iii) the sides in the longitudinal direction have a rounded border with a radius in the order of magnitude of half of the thickness of the glass support.

9. A dry imaging material comprising a glass support and a dry imaging layer applied to said support wherein:

(i) the thickness of said glass support is lower than 1.2 mm, (ii) said glass support has a failure stress (under tensile stress) equal to or higher than $5 \times 10^7$ Pa and (iii) the sides in the longitudinal direction have a rounded border with a radius in the order of magnitude of half of the thickness of the glass support.

10. A material for making a lithographic printing plate comprising on a glass support a surface capable of being differentiated in ink accepting and ink repellant areas in accordance with an image pattern, wherein said glass support has a thickness of not more than 0.5 mm, a failure stress of at least $5 \times 10^7$ Pa and the sides in the longitudinal direction have a rounded border with a radius in the order of magnitude of half of the thickness of the glass support.

11. A material according to claim 10 being image-able by laser ablation and comprising on said glass support a first layer comprising a polymer and a second layer underlying said first layer, wherein at least one of said first and second layer has an efficient absorption of infrared radiation and said first and second layers exhibiting different affinities for a printing fluid selected from the group consisting of ink and an adhesive fluid for ink.

12. A material according to claim 10 further comprising on said glass support a hydrophilic layer formed of a cross-linked hydrophilic polymer.

13. A material according to claim 10, comprising on said glass support a photosensitive layer.

14. A material according to claim 10 wherein said photosensitive layer comprises a diazonium salt, a diazo resin or a photo-cross-linkable composition.

15. A material according to claim 12 further comprising a layer including physical development nuclei on top of said hydrophilic layer.

16. A material according to claim 15, further comprising a photosensitive layer including a silver halide emulsion layer on top of said layer comprising physical development nuclei.

17. A material according to claim 10, comprising on said glass support, in the order given, a photosensitive layer including a silver halide and an image receiving layer including physical development nuclei.

\* \* \* \* \*